United States Patent
Sutherland

[11] Patent Number: 6,131,301
[45] Date of Patent: Oct. 17, 2000

[54] METHOD OF AND APPARATUS FOR MEASURING WORKPIECES USING A COORDINATE POSITIONING MACHINE

[75] Inventor: Alexander T Sutherland, Edinburgh, United Kingdom

[73] Assignee: Renishaw PLC, Gloucestershire, United Kingdom

[21] Appl. No.: 09/114,918

[22] Filed: Jul. 14, 1998

[30] Foreign Application Priority Data

Jul. 18, 1997 [GB] United Kingdom ............... 9715152

[51] Int. Cl.[7] .............................. G01B 7/012; G01B 7/00
[52] U.S. Cl. ................................................ 33/561; 33/558
[58] Field of Search ............................. 33/561, 558, 504, 33/503

[56] References Cited

U.S. PATENT DOCUMENTS

| | | |
|---|---|---|
| 4,118,871 | 10/1978 | Kirkham . |
| 4,177,568 | 12/1979 | Werner et al. . |
| 4,817,362 | 4/1989 | Archer ........................................ 33/832 |
| 5,077,473 | 12/1991 | Elings et al. . |
| 5,222,034 | 6/1993 | Shelton et al. ............................. 33/503 |
| 5,228,352 | 7/1993 | McMurtry ................................... 33/561 |
| 5,671,542 | 9/1997 | Zannis et al. .............................. 33/561 |

FOREIGN PATENT DOCUMENTS

| | | |
|---|---|---|
| 0147529 A2 | 7/1985 | European Pat. Off. . |
| 0420305 A2 | 4/1991 | European Pat. Off. . |
| 0501680 A1 | 9/1992 | European Pat. Off. . |
| 0501681 A1 | 9/1992 | European Pat. Off. . |
| 0 599 513 A1 | 6/1994 | European Pat. Off. . |
| 0605140 A1 | 7/1994 | European Pat. Off. . |
| 0695926 A1 | 2/1996 | European Pat. Off. . |
| 2 233 459 | 1/1991 | United Kingdom . |
| WO 92/20996 | 11/1992 | WIPO . |
| WO 94/21983 | 9/1994 | WIPO . |

Primary Examiner—Christopher W. Fulton
Attorney, Agent, or Firm—Oliff & Berridge, PLC

[57] ABSTRACT

Velocity dependent measurement errors made by coordinate measuring machines (CMMs) are corrected by deriving a polynomial expression which relates components of the errors to the relative velocity between the probe and the workpiece. A calibration is performed to establish the constant of the polynomial for different stylus configurations of the probe and these constants are stored. During a measuring process the probe produce analogue output signals from which a trigger signal is generated to latch the output signals of the machine measuring devices. The probe and machine output signals are monitored and recorded at clocked intervals over a range of positions within which lies the position at which the machine readings were latched. Actual relative velocity values are calculated at each position and, using these values and the stored constants, the errors in the machine readings at each position can be calculated from the polynomial. Signalling delays introduced to reduce false triggering of the probe can thus be compensated.

16 Claims, 2 Drawing Sheets

METHOD OF AND APPARATUS FOR MEASURING WORKPIECES USING A COORDINATE POSITIONING MACHINE

The present invention relates to a method of and apparatus for measuring dimensions of workpieces using a coordinate positioning machine such as, for example, a coordinate measuring machine (CMM) or a machine tool. In general such a machine is used to move a measuring probe in three dimensions under the control of a machine controller and includes measuring devices for determining the position of the machine relative to a datum at any instant during its movement. The machine carries a measuring probe which has a signalling device or devices which generate a signal when the probe achieves a predetermined position relative to a surface of the workpiece. The probes may be non-contact probes such as laser optical probes, video probes or proximity probes or may carry a stylus for contacting a workpiece surface. The probe signal is usually processed by a signal conditioning circuit in an interface unit to produce a trigger signal output which is passed to the machine, and is used by the machine to latch the readings of the measuring devices and to stop the machine.

The invention is particularly applicable where the probe has a workpiece-contacting stylus and signalling devices used by the probe generate an analogue output. Examples of such devices are strain gauges or piezoelectric elements. The outputs of the signalling devices are passed to the interface unit which sends its output in the form of a trigger signal to the machine when the outputs of the probe signalling devices reach a predetermined threshold level.

These known signalling devices are highly sensitive and can give rise to outputs in excess of the threshold level due to accelerations of the machine caused by vibrations or otherwise. These vibrations can cause the interface unit to produce a trigger signal, even though the stylus of the probe has not contacted the workpiece. Such trigger signals are known as false triggers and various attempts have been made in the past to eliminate such false triggers.

It is known, for example, from U.S. Pat. No. 4,177,568 to produce a first signal from highly sensitive piezoelectric elements, which is sent to the machine controller to read and latch the instantaneous position of the machine measuring devices, and also to produce a second signal at a predetermined time interval after the first signal, which confirms that the first signal was in fact a genuine trigger signal. The machine stop sequence is only initiated upon receipt of the confirmation signal. Other methods of reducing or eliminating the occurrence of false triggers have been disclosed in European Patents Nos. 420305, 605140, 641427, 695926, 501680 and 501681. Some of these methods result in the introduction of a time delay between the moment when the signal from the probe signalling devices achieves a threshold level, and the time at which a trigger signal is passed on from the interface unit to the machine controller to latch the machine readings and initiate the machine stop sequence.

The introduction of this time delay results in a compromise, because in general the longer the time delay, the more false triggers will be eliminated, but at the same time, the more vulnerable the measurements made by the probe are to inaccuracies due to the velocity at which the machine is moving at the instant that the trigger signal is produced. This is particularly so if the velocity is not constant.

It is also known that there is a time delay between the actual instant at which a stylus contacts a workpiece and the production by the probe signalling device, or devices, of the consequent probe signal. This delay, (which is referred to as the stylus propagation delay), is constant for any given stylus configuration and direction of probing, but can cause velocity dependent measurement errors when the probe is used at different relative velocities between the stylus and workpiece. However, the errors caused both by these stylus propagation delays and other delays can be calibrated and subsequently eliminated if the calibration is carried out at a specific relative velocity, and thereafter all measurements made on workpieces are carried out at the same relative velocity. This can be a restriction on the flexibility of the measurement process.

It is proposed in European Patent No. 147529 to correct for velocity dependent stylus propagation errors by calibrating the probe on the machine at many different velocities and thereafter correcting the measurements made by the machine at different velocities by reading off from a calibration table a correction factor which is appropriate to the nominal probing velocity.

While such a correction system can lead to improvements in measuring accuracy, different stylus configurations will have different characteristics. Thus, with this correction system, either a very large amount of pre-calibration data must be established in the calibration table, using all the different styli configurations which are likely to be used, and calibrating them at a complete range of speeds for different workpieces, or it will be necessary to generate a new calibration table each time a stylus is changed.

However, it is not always possible to know, particularly with a coordinate measuring machine, the actual velocity at which the machine is travelling at the instant the probe stylus contacts the workpiece surface.

For example, during a general inspection routine only the nominal position of the workpiece surface is known. It is therefore possible (e.g. if the probing cycle is started close to the surface and/or the probing velocity is high), for the machine to be accelerating or decelerating when the stylus contacts the workpiece surface. The machine will not therefore be travelling at the nominal probing velocity, and the correction applied will not be appropriate.

This problem is even more difficult to resolve when the machine includes a probe and interface which are conditioned to apply a significant additional time delay between the actual contact of the stylus with the workpiece surface, and the production of a trigger signal from the interface, in order to minimise false triggers. This is so, not only because of the greater distance that the machine will have travelled between the instant the stylus contacts the workpiece surface and the production of the trigger signal, but also because the mechanism which produces the time delay may itself also be velocity dependent and therefore adds to the total time delay between the actual instant of contact and the production of the trigger signal.

According to one embodiment the invention comprises the following steps:

establishing the components of the measurement error caused by the time delay between the probe reaching said predetermined position and the generation of the trigger signal, determining a mathematical functional relationship between said components and the relative velocity between the probe and the workpiece, performing a calibration to determine parameters of the mathematical functional relationship for a given probe configuration, storing the parameters, calculating from the outputs of the probe signalling device or devices and the machine measuring devices during a subsequent measuring process with the given probe configuration, the actual values of said relative velocity at least over a range of positions within which lies the position defined by the latched readings, and performing correction calculations using the stored parameters and the calculated relative velocities in the mathematical functional relationship to correct the latched readings for velocity dependent errors.

One of the conditions to be fulfilled by the probe signal before the signal conditioning circuit will produce a trigger signal output, is that the probe signal must reach a predetermined threshold level and remain above that threshold for a minimum time.

In one embodiment of the present invention, the signal conditioning circuit includes a filter which introduces a time delay between the generation of the probe signal and the generation by the signal conditioning circuit of the trigger signal. The time delay is sufficient to ensure that substantially all of the false trigger signals previously produced due to vibrations of the machine are eliminated.

In the preferred embodiment the probe signal is generated by strain gauges which produce an analogue output, and the signal conditioning circuit provides the trigger signal output only when the signal from at least one of the strain gauges has attained a predetermined threshold level and remained at or above that threshold level for a predetermined time. The filter is an analogue low pass filter which introduces a response time error from the varying signal produced by the strain gauges. Thus the trigger signal is produced from the signal conditioning circuit only when the output from the filter reaches a threshold level set by a comparator in the signal conditioning circuit.

The output response of the filter, however, is dependent on the rate of increase of the input signal which, in the preferred embodiment is the output from the strain gauges. This in turn is dependent on the relative velocity between the probe and the workpiece surface. As a result, the time delay produced by the filter is also dependent on the relative velocity.

Thus both the stylus propagation delay, which is fixed for a given stylus configuration and probing direction, and the velocity dependent filter delay, give rise to velocity dependent measuring errors.

Since both of these time delays are to a large extent consistent, in accordance with a novel feature of the invention, a prediction can be made of the functional relationship between the total time delay and the relative velocity of the probe and the workpiece in the form of a polynomial equation. The predicted relationship can be checked by a pre-calibration process in which a number of points on a calibration sphere are measured in several different directions at several different speeds, typically three, for a given stylus configuration. The resulting table of data will not be random and the predicted polynomial with appropriate coefficients will be able to be fitted to the required degree of accuracy.

The directions used may be limited to the X,Y and Z directions, in which case three relatively simple polynomial expressions can be predicted, one for each direction. Alternatively a more complex polynomial may be predicted for a probe contact in any direction and some off-axis directions will then be used in the pre-calibration.

Once the coefficients have been determined from the pre-calibration process the polynomial equation can be stored in the controller and then it is a simple matter, for each new stylus configuration, to take trigger signals at one, two or three speeds depending on the accuracy required, in order to determine the new coefficients of the polynomial equation for that stylus configuration.

Thereafter, during the measurement process, provided that the actual relative velocity at the point of contact between the stylus and the workpiece can be determined for each measurement, the total time delay or measurement error can be provided by inserting the value of the velocity into the polynomial equation. If it is not convenient to run the polynomial equation in real time to make the corrections, a look-up table may be established by solving the polynomial for a large number of velocities, and the look-up table can be stored in the controller memory.

In accordance with an embodiment of the invention, the velocity at each measurement point is determined by continually recording the outputs of the measuring devices of the machine at regular clocked intervals to provide a history of the relative displacement between the probe stylus and the workpiece. The measuring devices provide this information in the three machine axes X,Y and Z.

When the trigger signal is produced by the signal conditioning circuit, the instantaneous readings of the measuring devices are latched, and, knowing the orientation of the probe and stylus relative to the machine axes, the relative velocity of the stylus and workpiece at the next clocked interval is calculated from the recorded outputs of the measuring devices.

An assumption is made that the relative velocity of the instant the probe touched the workpiece surface was the same as the calculated velocity at the clocked interval. This calculated velocity therefore, is used to determine from the polynomial equation what the total time delay was between the instant of contact of the stylus and workpiece and the production of the trigger signal for each of the machine axes. The distance travelled by the machine in each axis (i.e. delay times axis velocity) is subtracted from the latched outputs to give an indication of what the outputs were at the instant the stylus contacted the workpiece.

Thus the invention in one of its embodiments provides a method of measuring dimensions of workpieces in which an estimation of the point of contact between the stylus and the workpiece surface at a plurality of different relative velocities can be more accurately determined than has been possible hitherto, while at the same time enabling a filter to be used to produce a time delay between the initial contact between the stylus and workpiece and the production of a trigger signal whereby many of the false triggers which occur due to vibration of the machine are eliminated.

In another embodiment, instead of using the binary trigger signal from the comparator, the output of the signal conditioning circuit may be digitised and continuously sampled and a trigger signal produced at a predetermined level of the digitised output. In such a case the calculated time delay is applied to shift the CMM position data relative to the conditioned probe signal, enabling estimation (by interpolation or extrapolation) of the CMM position at the instant of zero, or a selected finite deflection of the probe stylus.

It is to be understood that the relative velocity between the stylus and the workpiece surface may be produced either by moving that part of the machine on which the probe is mounted relative to a workpiece mounted on a fixed part of the machine or vice versa.

In other embodiments, depending on the accuracy required, the polynomial may be written to express only the filter delay, only stylus propagation delays if no filter is used, or a combination of the filter delay and the stylus propagation delay. Further, since the error in the measurement can be expressed as delay times velocity, and since the stylus propagation delay is also dependent on direction, the polynomial may be written as a function of measurement error against speed and direction, and may then include a term for other measurement errors which are not velocity dependent e.g. probe pre-travel which is dependent on direction.

Examples of the method will now be more particularly described with reference to the accompanying drawings in which.

Figure 1:
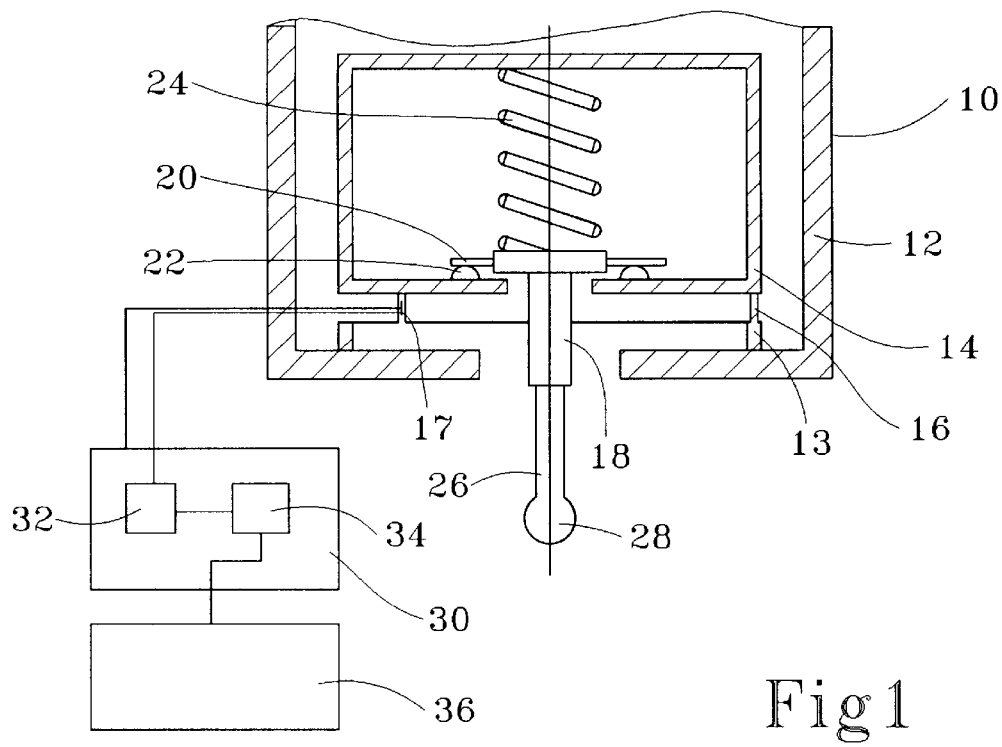
FIG. 1 is a schematic representation of a probe and its connection to an interface and a machine controller.

Referring now to FIG. 1, a probe 10 has a fixed structure 12 provided by a cylindrical housing. A cage 14 is supported within the housing upon a fixed support structure 13 which includes three areas of weakness in the form of pillars 16. Signalling devices in the form of strain gauges 17 are provided on each of the pillars 16. A stylus supporting member 18 is kinematically supported on the base of the cage 14 by the engagement of three rollers 20 on the supporting member 18, with the convergent surfaces provided by three adjacently positioned pairs of balls 22. The supporting member 18 is biased into this kinematic rest position with respect to the cage 14 by a compression spring 24. The supporting member 18 carries an elongate stylus 26 having a spherical sense tip 28 at its free end. In use, the probe is mounted on a movable arm of a machine which is operated to move the probe until the tip 28 comes in to contact with a surface of a workpiece the position of which is to be measured. The machine includes measuring devices, for example scales and scale readers, (which are well known per se) to determine displacements of its movable parts relative to a datum position. When the stylus contacts the workpiece strain is produced in the pillars 16 and is transmitted to the strain gauges 17.

An interface 30 supplies current to the gauges 17 and any change in their resistance due to strain in the pillars 16 will produce a voltage change in the interface. A signal conditioning circuit, which preferably forms part of the interface electronics, receives the output of the strain gauges as a probe signal, and normally includes a comparator which compares the output of the strain gauges with a threshold level $L_1$ (see FIG. 2), and outputs a trigger signal when one or more of the strain gauge outputs exceeds the threshold. The signal conditioning circuit ensures that the trigger signal is in the proper form to be received by the machine controller 36, and causes the controller to latch the outputs of the measuring devices.

Such a probe and interface are well known per se and are more fully described in our U.S. Pat. No. 4,817,362.

In this embodiment of the invention the signal conditioning circuit further includes an analogue low pass filter 32, which receives the outputs of the strain gauges 17 directly, and the output of the filter is passed to a comparator 34.

The filter introduces a response time error such that its output does not rise at the same rate as the output of the strain gauges 17. The comparator is used to set a threshold level $L_2$ for the filter output, and outputs a binary trigger signal when the filter output reaches this threshold level.

The controller 36 includes a timing circuit and monitors the outputs of the measuring devices on the three machine axes X,Y and Z at regular intervals, for example 1 millisecond. The velocities in each axis direction may be calculated at the end of each clock period and the most recent positions and velocities are stored for a short time so that the controller maintains a brief history of the machine performance in its memory.

Upon receipt of the trigger signal from the interface, the controller freezes the outputs of the measuring devices at that instant and commence the machine stop sequence.

Figure 2:
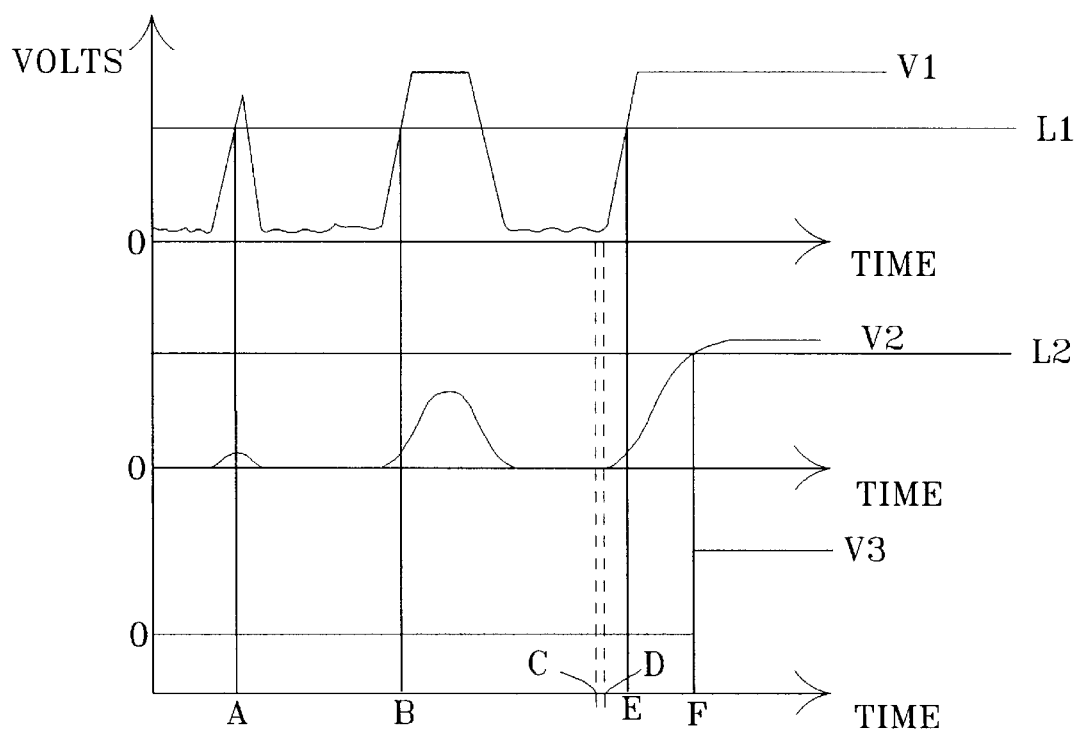
FIG. 2 is a signal diagram showing how the probe trigger signal is produced.
Figure 3:
FIG. 3 is a curve showing how the measuring error resulting from the total time delay between the instant of contact of the stylus with the workpiece and the production of the probe trigger signal might vary with velocity; and, FIG. 4 is a curve showing the plot of machine displacement against time.

Referring now to FIG. 2, the top curve illustrates a typical signal profile of the voltage $V_1$ across the strain gauges against time during part of a probing cycle. The middle and lower curves respectively show the corresponding outputs $V_2$ and $V_3$ respectively of the filter 32 and the comparator 34 in the interface.

The threshold level $L_1$ shown in the top curve is the level of output that at least one of the strain gauges would have to reach for a trigger signal to be generated in the absence of the filter 32 and comparator 34. It can be seen that at two points A and B the voltage level from the strain gauges has exceeded the threshold for short durations before dropping back, while at point E the voltage has exceeded the threshold and remains above the threshold for some considerable time.

The two short duration signals are caused by vibrations of the machine whereas the longer duration signal is caused by contact of the stylus with a workpiece surface. The short duration signals are false trigger signals which, if transmitted to the machine controller, would cause the controller to latch the outputs of the measuring devices of the machine and initiate the machine stop sequence.

The inclusion of the filter 32 and comparator 34 is designed to eliminate these false trigger signals, and only to send signals to the machine controller which relate to genuine contacts between the stylus and the workpiece.

From the middle curve it can be seen that the build up of the filter signal at points A and B is significantly slower than the strain gauge output, which means that the filter output does not reach the threshold level L2 set by the comparator 34 before decaying as the strain gauge signal decays. For the genuine contact signal however at E, it can be seen that the filter signal builds up to the threshold level L2 at point F a short time after the strain gauge output has reached its threshold level $L_1$, and, as can be seen from the bottom curve, this causes the comparator to generate its binary trigger at that time.

Comparing the timing of the various signals it can be seen that a substantial delay has occurred between the contact of the stylus with the workpiece and the generation at F of the binary trigger signal output from the comparator. This trigger signal is the one which is sent to the controller to latch the outputs of the measuring devices of the machine, and commence the stop sequence of the machine.

Two other lines have been marked on the curves, the first one at point C indicates the actual instant of contact between the stylus and the workpiece, and the next one at D indicates the start of the build up of the voltage from the strain gauges as the strain on the pillars increases. The time interval between C and D is the stylus propagation delay and this is constant for any given stylus configuration and probing direction.

The time interval between point D and point F is the delay built in by the filter in order to minimise the production of false trigger signals.

The cumulative effect of all these time intervals means that when the outputs of the measuring devices are latched by the controller upon receipt of the probe triggered signal from the interface, they will record a position which is significantly different from the position at which the stylus first contacted the workpiece.

Clearly the faster the machine happens to be going at the time the stylus contacts the workpiece, the more significant will be the error in the reading of the measuring devices of the machine due to the velocity of the machine.

In order to overcome this problem it is necessary to calibrate the system to determine the total measurement error against the velocity of the machine. In the prior art method described in European Patent No. 147529 this would involve, for each stylus configuration required, taking a large number of measurements in each of the X,Y and Z axis directions at different speeds and preparing a look-up table of errors against speed in each axis. This is stored in the machine controller to correct the latched readings.

Using the method according to the invention this process can be simplified, and can deal with either, stylus propagation delays only, or a combination of stylus propagation delays and filter delays. The method can also be used to take over errors into account.

In the preferred embodiment of the invention, knowledge of the mechanisms causing the delays is used to predict a functional relationship between the total time delay and the velocity at which the probing operation takes place (i.e. both speed and direction). This will usually takes the form of a polynomial equation or trigonometric function.

The calibration is then carried out for a given stylus configuration. The calibration consists of making measurements of a calibration sphere by driving the probe stylus towards the centre of the sphere at a limited number of speeds, typically three, and in a number of different directions, and noting when contact is made. Then using best fit algorithms, a curve representing the predicted function can be fitted to the calibration data and the coefficients of the polynomial determined.

An example of the kind of predictions to be made is as follows:

It is known that stylus propagation delays are constant for any given stylus tip, in any given stylus configuration, for any given probing direction. For example, when using the z probing direction, the delay is very small (the propagation being axial at the velocity of sound in the material), whereas in the x and y probing directions the delays are at the maximum (propagation being a lateral wave, the velocity of which is dependent on various stylus parameters such as stiffness and density). Thus a general expression for the stylus propagation delay could be written;

$$\text{delay} = d \cos e \qquad 1.$$

where d is a constant
and e is the elevation of the probing direction from the horizontal.

Similarly, the filter delay depends on the profile of the input probe signal versus time, and the filter parameters. The profile of the probe signal is dependent, inter alia, on both the speed and direction of probing. For example, in the pure z direction of the probe signal will rise much faster than in the x or y directions.

If the filter delay was found during development to be proportional to the velocity, then the functional relationship between the sum of the two delays and the probing velocity could be written as;

$$\text{delay} = K_1 \cos e + K_2 V \qquad 2.$$

Thus by measuring in the different directions at two speeds the two constants $K_1$ and $K_2$ can be found. Because these coefficients are obtained from actual measurements they will also take into account any other delays which may be speed- or direction-dependent.

The polynomial is stored in the controller and can be used to determine the delays of other stylus configurations and filters.

Instead of storing a polynomial which relates simply to the delay in the system, a more comprehensive polynomial may be predicted by considering the actual measuring errors. The measuring errors are obtained by multiplying the delay by the velocity so that equation 2 becomes modified to;

$$\text{error} = K_1 \cos(e).V + K_2.V^2 \qquad 3.$$

Then an additional term can be added for measuring errors attributable, for example, to pretravel errors of the probe which are dependent on direction but not velocity. This term can be written;

$$\text{error} = K_3 \cos e \qquad 4.$$

Thus a general expression for the total measuring error would be a second order polynomial of the type;

$$\text{Error} = K_3 \cos e + K_1 \cos(e).V + K_2 V^2 \qquad 5.$$

To solve this polynomial for $K_1, K_2$ and $K_3$ requires measurements of each point at three speeds.

The speed and direction of the probing movement are determined from the history of the machine positions versus time in the three machine axes stored in the controller memory. These are converted into speeds and directions in the probe/stylus axes by a transformation from a knowledge of the probe/stylus orientation relative to the machine axes.

Once the polynomial has been derived, other different stylus configurations can be calibrated prior to performing a measuring routine by simply taking measurements at an appropriate number of speeds to identify the new constants of the polynomial for the given stylus configuration, and storing the new polynomial in the controller memory.

An example of how the measurements made by the machine are corrected with now be described with reference to FIG. 4. This example assumes that the correction polynomial is of the type shown in equation 2 which relates only to the delays of the stylus and filter.

As an initial step measurements are made at two speeds to determine the two polynomial coefficients for the stylus configuration being used. Then, during the measurement process, if the controller receives a trigger signal at time T, the current position of the probe (point A) is latched. At the end of the next clock cycle (point B), the axis speeds of the machine are used to evaluate the probe axis speeds, and these speed values are entered into the polynomial equations along with the value of e for the particular measurement to provide estimates of the delay dt, that must have occurred due to the filter and stylus in each axis. Using the latched machine position values and the axis speed values, the machine position at time T-dt (point P) can be calculated and this is assumed to be the true contact position. This calculation may be carried out within the controller or in a post-processing computer connected to the controller.

Thus, the method of the invention allows corrections to be made to the latched machine axis positions using velocity values which are a much closer approximation to the actual velocity values than relying on the demanded velocity values. It is possible however, that the machine may have been accelerating or decelerating at the point of contact, and a slightly more elaborate correction method could be used in which the velocities calculated at the ends of several clock cycles up to and including point B are used to enable a more precise estimate of the velocity of the point of contact P to be made.

This would involve calculating the average velocity across the clocked time intervals using the position information available at the beginning and end of each clock pulse.

If greater accuracy is required, an iterative approach may be used for each measurement. For example, if the delay dt was significant such that the point P was found to be earlier than the latched point A by two or more clock periods, as shown, the calculated speeds (whether using the speed at B or the average speed up to point B), may not reflect the true speed at P. Thus the calculation could be repeated using the average speed over the time interval which includes point P to provide a better estimate of the position of point P.

This iterative approach may also be used in the pre-calibration process in which the coefficients of the polynomial are being determine in order to compensate for the filter and stylus propagation delays in the trigger signals being used to generate the data on which the polynomials are based.

Figure 4:
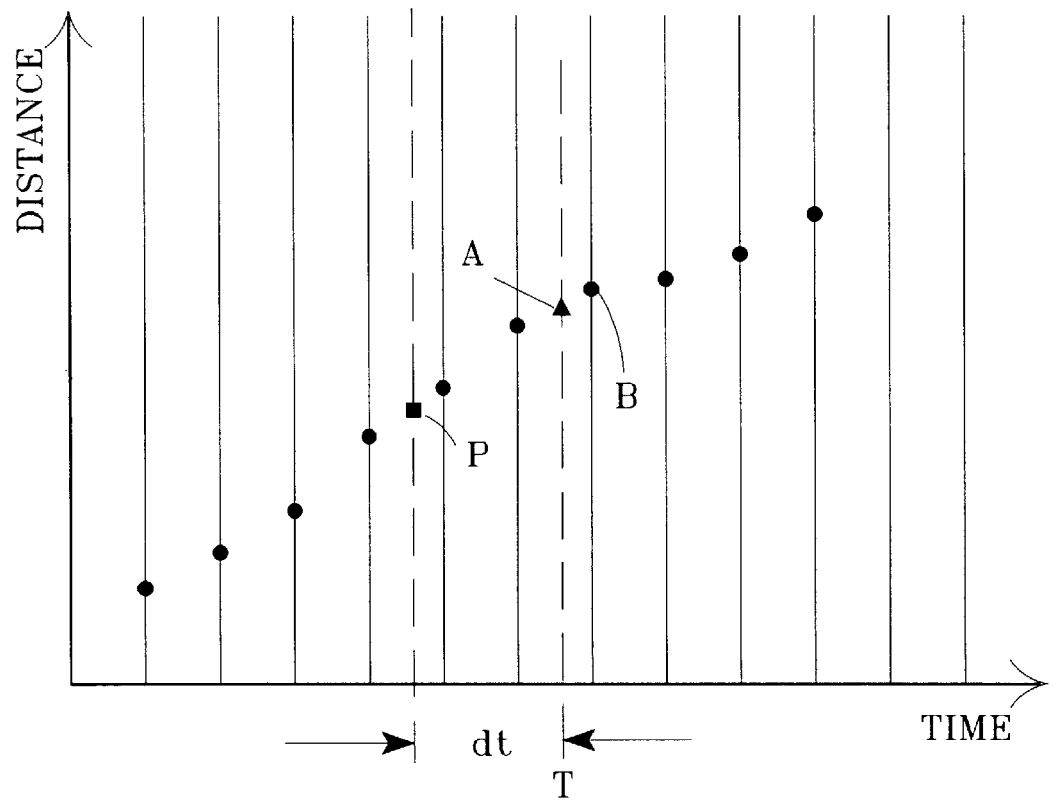

FIG. 4 illustrates the calculation sequence which is used based on the polynomials defining the delays. If the more general polynomial defining the error is used, the x,y and z components of the latched position can be corrected directly without the intermediate step of calculating the delay dt.

In an alternative method of measuring with probes it is known to produce the measurement signal when the probe leaves the workpiece surface as the machine is reversed following a contact between the probe stylus and the workpiece surface. Such a method is described for example using a touch trigger probe in U.S. Pat. No. 4,118,871, and using an analogue probe in International Publication No. WO92/20996.

The present invention can be applied in a novel way to improve this measurement method in the following way.

The controller samples the outputs from the measuring devices of the machine and the probe continuously at clocked intervals. It is able to detect therefore when the signal conditioning circuit outputs a trigger signal, or if it is digitising the outputs, it can detect when the probe readings start to rise. In either case this is an indication that contact has been made between the stylus and the workpiece. The readings of the measuring devices are latched upon receipt of the trigger signal, or at a predetermined rise in the digitised signal level, but the controller continues to drive the machine to overtravel the probe into the surface by a predetermined minimum distance (say 300 µm) before initiating the stop sequence.

The amount of overtravel may be varied but the minimum distance required is that which gives the controller time to accelerate the machine up to a constant velocity in reverse before the probe leaves contact with the surface enabling the probe to re-seat at a steady state velocity.

From the latched readings and the probe velocity calculation a velocity compensated position of the point of contact between the stylus and the workpiece is determined. The controller then drives the probe in reverse through this accurately known point preferably normal to the workpiece surface and at a slower, closely controlled, constant velocity, and latches the readings of the measuring devices at the first re-seat condition to be encountered. With the probe re-seating at steady state velocity there are no transient shocks to cause errors and the latched readings, once again compensated for velocity can be taken as an accurate indication of the true surface point.

In an enhancement to this technique the controller may synchronously record a sequence of probe and CMM outputs as the machine reverses, so that an estimate can be made with velocity compensation of the CMM position at a selected finite deflection, or at just zero deflection by interpolation or extrapolation respectively of these recorded outputs.

What is claimed is:

1. A method of measuring dimensions of a workpiece using a coordinate positioning machine for causing relative movement between a measuring probe and the workpiece, the coordinate positioning machine having measuring devices for determining the positions of the movable machine parts during said relative movement, the probe having at least one signalling device from the output of which a trigger signal is generated when the probe achieves a predetermined position relative to a surface of the workpiece, said trigger signal being used to latch the readings of the measuring devices of the machine, the method comprising the steps of:

establishing the components of the measurement error caused by the time delay between the probe reaching said predetermined position and the generation of the trigger signal, determining a mathematical functional relationship between said components and the relative velocity between the probe and the workpiece, performing a calibration to determine parameters of the mathematical functional relationship for a given probe configuration, storing the parameters, calculating from the outputs of the probe signalling device or devices and the machine measuring devices during a subsequent measuring process with the given probe configuration, the actual values of said relative velocity at least over a range of positions within which lies the position defined by the latched readings, and performing correction calculations using the stored parameters and the calculated relative velocities in the mathematical functional relationship to correct the latched readings for velocity dependent errors.

2. A method according to claim 1 and wherein the mathematical functional relationship is determined by predicting its form from knowledge of the components of the time delay, and performing a pre-calibration to verify the prediction and fit appropriate constants to obtain the required level of accuracy.

3. A method according to claim 1 and wherein the actual values of the relative velocity over said range of positions are calculated from readings of the machine measuring devices taken at clocked intervals and stored.

4. A method according to claim 1 and wherein the mathematical functional relationship is a polynomial equation and the parameters to be determined by the calibration step are the coefficients of the polynomial for the given probe configuration.

5. A method according to claim 1 and wherein the components of the measurement error are expressed in the mathematical functional relationship in terms of components of the time delay between the probe achieving said predetermined position and the generation of the trigger signal.

6. A method according to claim 1 and wherein the components of the measuring error are expressed in the mathematical functional relationship directly as error components by multiplying each component of the time delay by velocity.

7. A method according to claim 1 and wherein said at least one probe signalling device generates an analogue output which is passed to an electrical circuit which generates the trigger signal only when said output reaches a predetermined threshold level.

8. A method according to claim 7 and wherein the electrical circuit includes a filter which introduces a time delay between said output reaching the predetermined threshold level and the generation of the trigger signal.

9. A method according to claim 7 and wherein the probe carries a stylus and said at least one signalling device produces an output by contact of the stylus with the workpiece surface.

10. A method according to claim 1 and wherein a mathematical functional relationship is derived for each of the machine axes separately, and the latched readings from the measuring devices of the machine on each axis are corrected separately.

11. A method according to claim 1 and wherein a complex mathematical functional relationship is derived for a combination of machine axes and the latched readings from the measuring devices of the machine are corrected in accordance with the complex functional relationship.

12. A method according to claim 9 and comprising the further steps of:
   continuing to drive the machine in the same direction for a relatively small distance after the trigger signal has been generated and the readings of the machine measuring devices have been latched in order to overtravel the stylus before stopping the machine,
   calculating a correction to the latched readings to give a position of the point of contact between the stylus and workpiece corrected for velocity dependent errors,
   driving the machine in the reverse direction through the corrected contact position and at the same time synchronously recording a sequence of readings of the measuring devices of the machine and corresponding outputs from said at least one signalling device of the probe, and
   making an estimation of the position of the machine when the deflection of the stylus has reduced to a predetermined amount.

13. A method according to claim 12 and wherein the machine is driven at constant velocity in the reverse direction through the corrected contact position.

14. A method according to claim 12 and wherein the step of making an estimation of the position of the machine when the deflection of the stylus is reduced to a predetermined amount is achieved by interpolation or extrapolation of the recorded sequence of readings.

15. A method according to claim 12 and wherein the predetermined amount of stylus deflection is zero and the step of making an estimation of the position of the machine when the deflection of the stylus deflection is reduced to said predetermined amount is achieved by latching the readings of the measuring devices of the machine as soon as possible after the output of said at least one signalling device of the probe has reduced to zero.

16. A method of measuring dimensions of a workpiece using a coordinate positioning machine for causing relative movement between a measuring probe and the workpiece, the coordinate positioning machine having measuring devices for determining the positions of the movable machine parts during said relative movement, the probe having at least one signalling device from the output of which a trigger signal is generated when the probe achieves a predetermined position relative to a surface of the workpiece, said trigger signal being used to latch the readings of the measuring devices of the machine, the method comprising the steps of:
   performing a calibration to determine, for a given probe configuration, parameters of a mathematical functional relationship between error components of a measurement error and the relative velocity between the probe and the workpiece, said error components being those caused by the time delay between the probe reaching the predetermined position and the generation of the trigger signal;
   storing the parameters;
   calculating from the output of the at least one probe signaling device and the machine measuring devices during a subsequent measuring process with the given probe configuration, the actual values of said relative velocity at least over a range of positions within which lies the position defined by the latched readings; and
   performing correction calculations using the stored parameters and the calculated relative velocities in the mathematical functional relationships to correct the latched readings for velocity dependent errors.

* * * * *